United States Patent
Chen et al.

(10) Patent No.: US 9,804,694 B2
(45) Date of Patent: Oct. 31, 2017

(54) CONTROL SYSTEM, MOUSE AND CONTROL METHOD THEREOF

(71) Applicant: PIXART IMAGING INC., Hsin-Chu (TW)

(72) Inventors: Chun-Wei Chen, Hsin-Chu (TW); Yen-Min Chang, Hsin-Chu (TW); Shih-Wei Kuo, Hsin-Chu (TW); Ching-Lin Chung, Hsin-Chu (TW)

(73) Assignee: PIXART IMAGING INC., Hsin-Chu (TW)

( * ) Notice: Subject to any disclaimer, the term of this patent is extended or adjusted under 35 U.S.C. 154(b) by 875 days.

(21) Appl. No.: 13/960,369

(22) Filed: Aug. 6, 2013

(65) Prior Publication Data
US 2014/0210724 A1 Jul. 31, 2014

(30) Foreign Application Priority Data
Jan. 28, 2013 (TW) .............................. 102103036 A (51) Int. Cl.
*G06F 3/038* (2013.01)
*G06F 3/0354* (2013.01)

(52) U.S. Cl.
CPC ........ *G06F 3/0383* (2013.01); *G06F 3/03543* (2013.01)

(58) Field of Classification Search
CPC ............................ G06F 3/03543; G06F 3/0383
See application file for complete search history.

(56) References Cited

U.S. PATENT DOCUMENTS

| | | | |
|---|---|---|---|
| 6,344,846 B1 * | 2/2002 | Hines | ................. G06F 3/03543 345/156 |
| 2004/0046741 A1 * | 3/2004 | Low | ..................... G06F 3/0317 345/166 |

(Continued)

FOREIGN PATENT DOCUMENTS

| | | |
|---|---|---|
| TW | 200919261 A | 5/2009 |
| TW | M412353 U | 9/2011 |
| TW | 201239685 A | 10/2012 |

OTHER PUBLICATIONS

Office Action to the corresponding TW Patent Application No. 102103036 rendered by the Taiwan Intellectual Property Office (TIPO); Date of Mailing: Jan. 20, 2015, with English translation.

*Primary Examiner* — Kenneth Bukowski
(74) *Attorney, Agent, or Firm* — Cantor Colburn LLP (57) ABSTRACT

A control system, a mouse and a control method thereof are provided. The control system comprises a dongle and the mouse. The dongle is wiredly connected to a host and has a first light source for emitting a first light. The mouse is wirelessly connected to the dongle and has a transmitter, a second light source for emitting a second light, an optical sensor and a processor. The optical sensor senses the first light at a first time interval to generate a first sensing signal and then also, senses the second light at a second time interval to generate a second sensing signal. The processor generates a first control signal and a second control signal according to the first sensing signal and the second sensing signal, respectively, and transmits them to the dongle via the transmitter so that the host receives the first and second control signals via the dongle.

21 Claims, 7 Drawing Sheets

(56) References Cited

U.S. PATENT DOCUMENTS

| | | | |
|---|---|---|---|
| 2007/0008286 A1* | 1/2007 | Theytaz | G06F 3/03543 345/166 |
| 2008/0266251 A1* | 10/2008 | Chao | G06F 3/0304 345/157 |
| 2009/0102789 A1 | 4/2009 | Kuo et al. | |
| 2009/0289894 A1* | 11/2009 | Lai | G06F 3/03543 345/156 |
| 2010/0123655 A1* | 5/2010 | Lai | G06F 3/0317 345/156 |
| 2013/0229387 A1* | 9/2013 | Chen | G06F 3/042 345/175 |

* cited by examiner

CONTROL SYSTEM, MOUSE AND CONTROL METHOD THEREOF

CROSS-REFERENCES TO RELATED APPLICATIONS

This application claims the benefit of priority based on Taiwan Patent Application No. 102103036 filed on Jan. 28, 2013, which is hereby incorporated by reference in its entirety.

BACKGROUND OF THE INVENTION

Field of the Invention

The present invention relates to a control system, a mouse and a control method thereof More particularly, the mouse of the control system of the present invention can be used for different applications by sensing different lights, which are generated by different light sources at different time intervals.

Descriptions of the Related Art

With the widespread use of personal computers (PCs), various peripheral operating devices such as wireless optical mice and wireless touch pads have been available in the market to allow users to operate operating systems conveniently and in diversified ways.

Existing wireless optical mice are used with dongles. The dongle is plugged into a host to receive a control signal from the wireless optical mouse. The wireless optical mouse has a light source for illuminating an operating plane and a light sensor for sensing the light. Accordingly, according to a sensing signal generated by the light sensor, the wireless optical mouse can generate and transmit a control signal to the dongle to operate the operating system running on the host according to the control signal.

However, the wireless optical mice currently available in the market only have a single application, i.e., can only sense a single light source to generate and transmit a control signal to the dongle. In view of this, an urgent need exists in the art to enable the wireless optical mice to have more applications.

SUMMARY OF THE INVENTION

An objective of the present invention is to provide a control system, a mouse and a control method thereof The control system of the present invention comprises a dongle and a mouse. Both the dongle and the mouse have a light source. The mouse can sense lights, which are generated by different light sources at different time intervals to generate corresponding control signals, and control a host to execute different operations according to the control signals. Thus, the wireless optical mouse of the present invention will have more applications.

To achieve the aforesaid objective, the present invention discloses a control system, which has a dongle and a mouse. The dongle is wiredly connected to a host and has a first light source for emitting a first light. The mouse is wirelessly connected to the dongle, and comprises a transmitter, a second light source, a light sensor and a processor. The second light source is configured to emit a second light. The light sensor is configured to, according to a schedule defining a first time interval and a second time interval, sense the first light through a first light guide path to generate a first sensing signal at the first time interval and sense the second light through a second light guide path to generate a second sensing signal at the second time interval. The processor is electrically connected to the transmitter and the light sensor, and is configured to generate a first control signal according to the first sensing signal, generate a second control signal according to the second sensing signal and transmit the first control signal and the second control signal to the dongle via the transmitter so that the host receives the first control signal and the second control signal via the dongle.

Furthermore, to achieve the aforesaid objective, the present invention further discloses a mouse, which is used with a dongle. The dongle is wiredly connected to a host and has a first light source for emitting a first light. The mouse is wirelessly connected to the dongle, and comprises a transmitter, a second light source, a light sensor and a processor. The second light source is configured to emit a second light. The light sensor is configured to, according to a schedule defining a first time interval and a second time interval, sense the first light through a first light guide path to generate a first sensing signal at the first time interval, and sense the second light through a second light guide path to generate a second sensing signal at the second time interval. The processor is electrically connected to the transmitter and the light sensor, and is configured to generate a first control signal according to the first sensing signal, generate a second control signal according to the second sensing signal and transmit the first control signal and the second control signal to the dongle via the transmitter so that the host receives the first control signal and the second control signal via the dongle.

Furthermore, to achieve the aforesaid objective, the present invention further discloses a control method for a mouse. The mouse is used with a dongle and is wirelessly connected to the dongle. The dongle is wiredly connected to a host and has a first light source for emitting a first light. The mouse comprises a transmitter, a second light source, a light sensor, and a processor. The second light source is configured to emit a second light. The processor is electrically connected to the transmitter and the light sensor. The control method is executed by the processor, and comprises the following steps: enabling the light sensor to, according to a schedule defining a first time interval and a second time interval, sense the first light through a first light guide path to generate a first sensing signal at the first time interval, and sense the second light through a second light guide path to generate a second sensing signal at the second time interval; generating a first control signal according to the first sensing signal; generating a second control signal according to the second sensing signal; and transmitting the first control signal and the second control signal to the dongle via the transmitter so that the host receives the first control signal and the second control signal via the dongle.

The detailed technology and preferred embodiments implemented for the subject invention are described in the following paragraphs accompanying the appended drawings for people skilled in this field to well appreciate the features of the claimed invention.

DESCRIPTION OF THE PREFERRED EMBODIMENT

The present invention provides a control system, a mouse and a control method thereof. It shall be appreciated that the following embodiments are provided to illustrate the technical contents of the present invention, but are not intended to limit the scope of the present invention. Furthermore, in the following embodiments and the attached drawings, elements unrelated to the present invention are omitted from depiction; and the dimensional relationships among individual elements in the attached drawings are illustrated only for ease of understanding but not to limit the actual scale.

Figure 1:
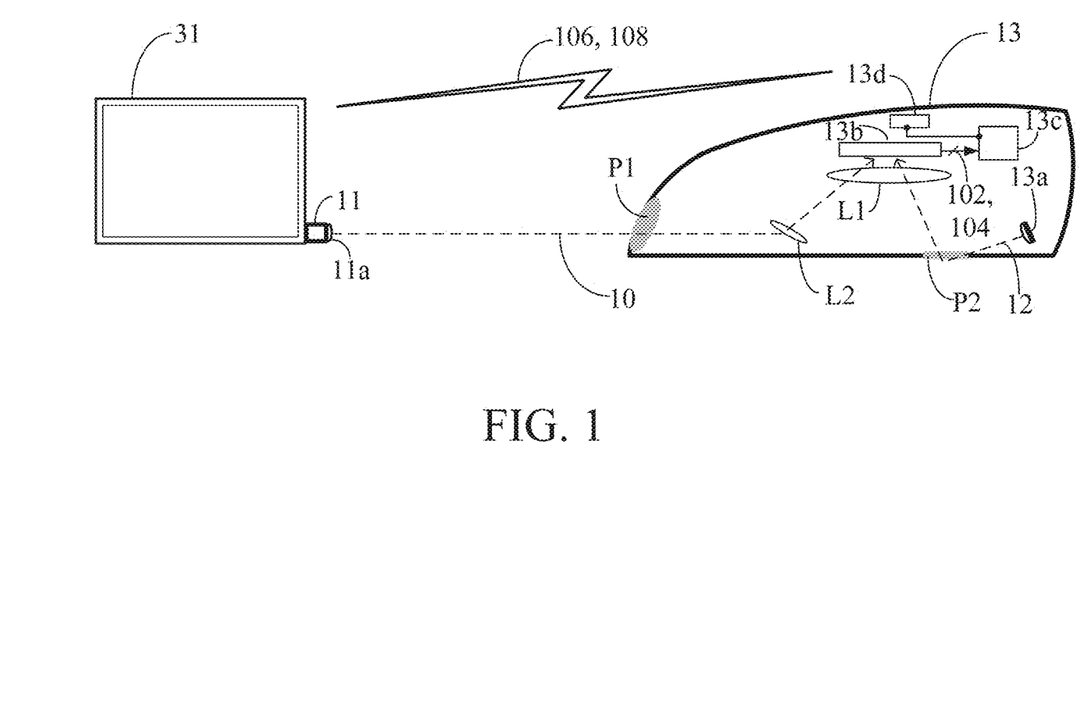
FIG. 1 is a schematic view of a control system 1 according to the first embodiment of the present invention.

The first embodiment of the present invention is as shown in FIG. 1, which is a schematic view of a control system 1. The control system 1 comprises a dongle 11 and a mouse 13. The dongle 11 may be wiredly connected to a host 31 via a Universal Serial Bus (USB) interface. The dongle 11 has a first light source 11a for emitting a first light.

The mouse 13 and the dongle 11 are wirelessly connected to each other based on the 2.4G wireless technology, although the present invention is not limited thereto. The mouse 13 has a second light source 13a, a light sensor 13b, a processor 13c and a transmitter 13d. The second light source 13a is configured to emit a second light. The processor 13c is electrically connected to the light sensor 13b and the transmitter 13d. The light sensor 13b, according to a schedule defining a first time interval T1 and a second time interval T2, senses the first light through a first light guide path 10 to generate a first sensing signal 102 at the first time interval T1 and senses the second light through a second light guide path 12 to generate a second sensing signal 104 at the second time interval T2.

Figure 2:
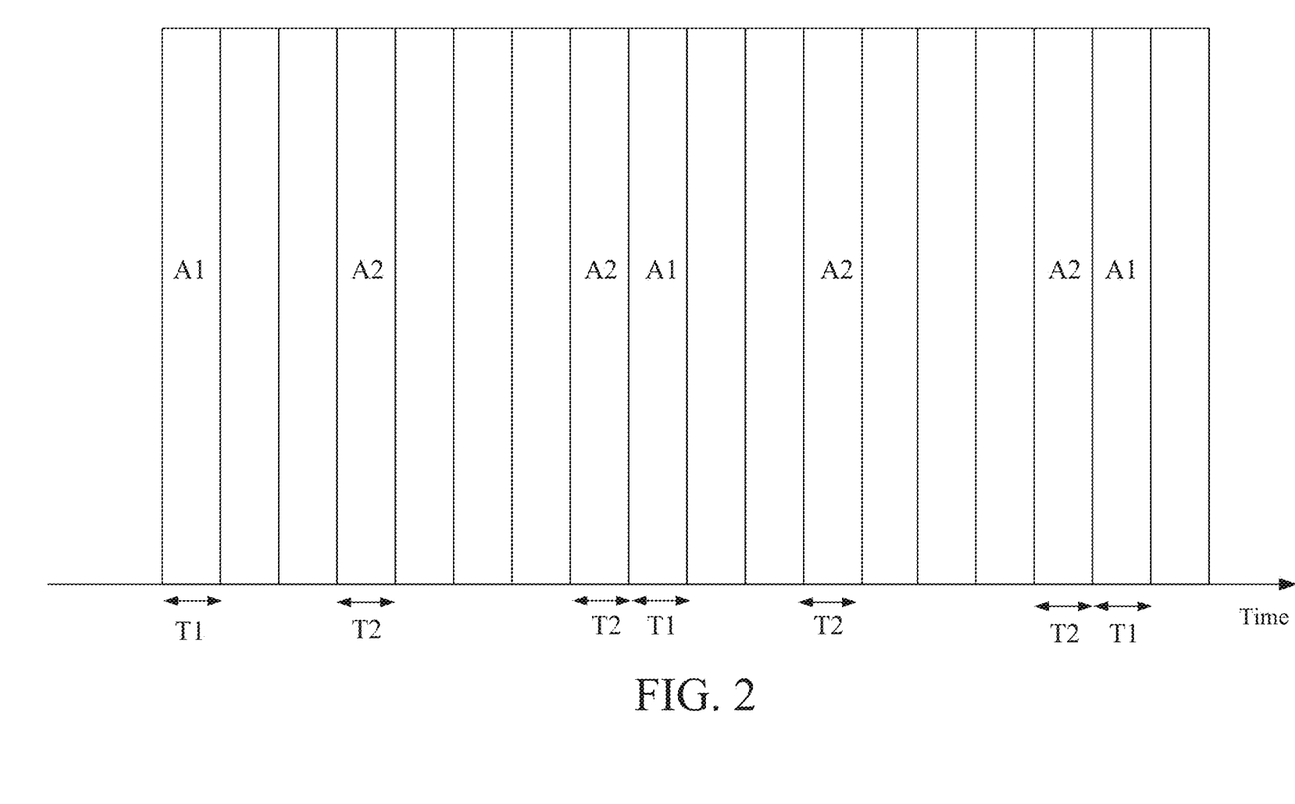
FIG. 2 is a schematic view of a schedule according to the first embodiment of the present invention.

Specifically, the mouse 13 further has a first light transmission region P1, a second light transmission region P2, a lens L1 and a lens L2. The first light guide path 10 allows the first light to be transmitted to the light sensor 13b via the first light transmission region P1, the lens L2 and the lens L1, and the second light guide path allows the second light to be transmitted to the light sensor 13b via the second light transmission region P2 and the lens L1. The processor 13c is designed in advance to have the schedule of the first time interval T1 and the second time interval T2, as shown in FIG. 2. According to the schedule, the mouse 13 can be used for different applications (i.e., an application A1 and an application A2) at the first time interval T1 and the second time interval T2 respectively.

In detail, the processor 13c can generate a first control signal 106 related to the application A1 according to the first sensing signal 102, and generate a second control signal 108 related to the application A2 according to the second sensing signal 104. Then, the processor 13c transmits the first control signal 106 and the second control signal 108 to the dongle 11 via the transmitter 13d so that the host 31 receives the first control signal 106 and the second control signal 108 via the dongle 11 to execute corresponding operations respectively.

It shall be appreciated that the first light source 11a and the second light source 13a can respectively generate the first light and the second light with different wavelengths or phase differences so that the light sensor 13b can sense and distinguish between the first light and the second light according to the wavelengths or the phase differences. According to the first sensing signal 102 and the second sensing signal 104 generated by sensing the first light and the second light respectively, the processor 13c can generate different control signals (i.e., the first control signal 106 and the second control signal 108) so that the host 31 receives the first control signal 106 and the second control signal 108 to execute different operations.

For example, for the application A1, the processor 13c can calculate range information between the dongle 11 and the mouse 13 according to the first sensing signal 102 generated at the first time interval T1 and generate the first control signal 106 according to the range information so that the host 31 adjusts a window size of a program running on the host 31 according to the first control signal 106.

Furthermore, for the application A1, the processor 13c of the mouse can further adjust a radio frequency (RF) power of the transmitter 13d (i.e., the RF power at which the first control signal 106 and the second control signal 108 are transmitted) according to the range information. Thus, as the dongle 11 and the mouse 13 approach each other, the mouse 13 can reduce the RF power of the transmitter 13d to reduce the overall power consumption.

On the other hand, for the application A2, the second light generated by the second light source 13a is used for the general purpose of conventional optical mice; that is, the second light is irradiated onto an operating plane, where the user uses the mouse, through the second light transmission region P2 to obtain a reflected light, which is then received by the light sensor 13b through the second light transmission region P2 and the lens L1. Thus, the processor 13c can calculate the displacement information according to the second sensing signal 104 generated by the light sensor 13b at the second time interval T2 to generate the second control signal 108 so that the host 31 adjusts a display position of a cursor according to the second control signal 108.

It shall be appreciated that apart from having the first light source 11a and the second light source 13a generate both the first light and the second light with different wavelengths or phase differences respectively, the mouse 13 of the present invention can also distinguish between the first light and the second light by appropriately adjusting the light guide paths to allow the first light and the second light to be received by different regions of the light sensor 13b respectively, and correspondingly generate the first sensing signal 102 and the second sensing signal 104 respectively.

Figure 3:
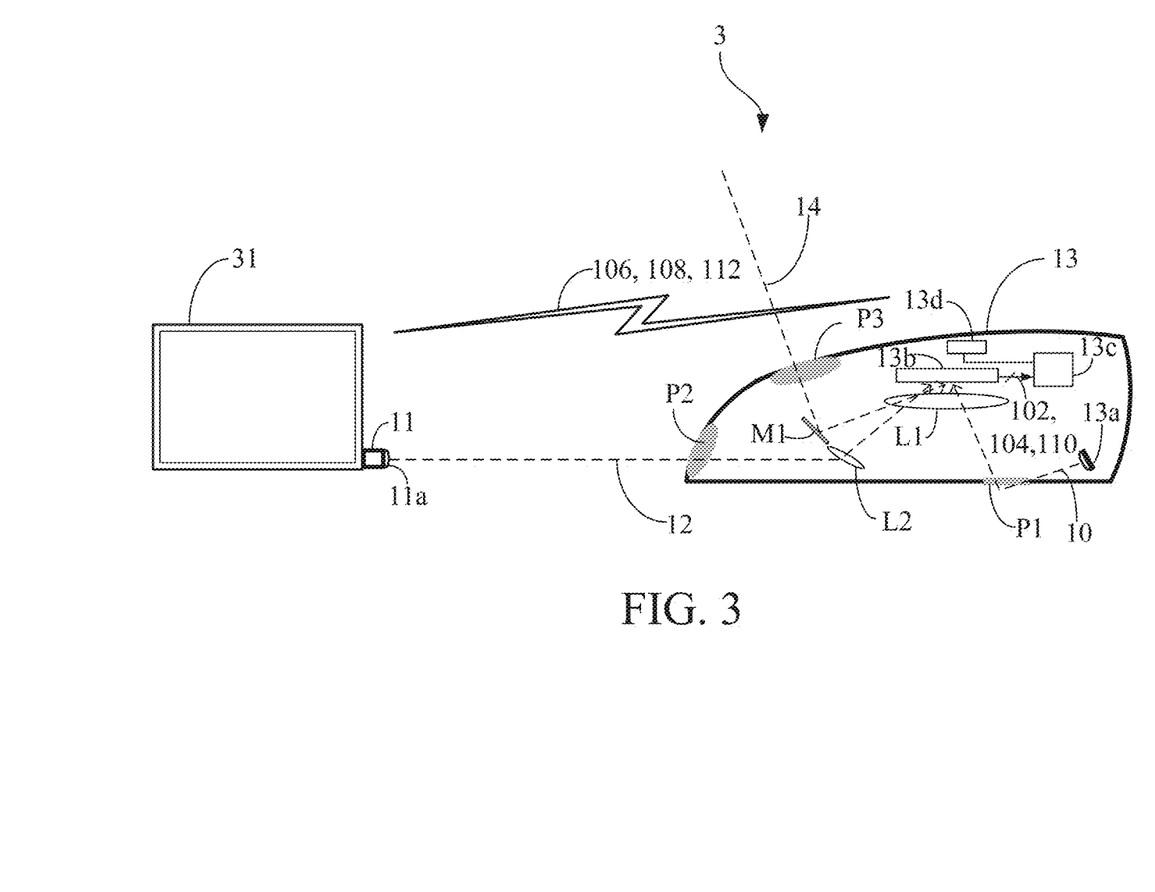
FIG. 3 is a schematic view of a control system 3 according to the second embodiment of the present invention.
Figure 4:
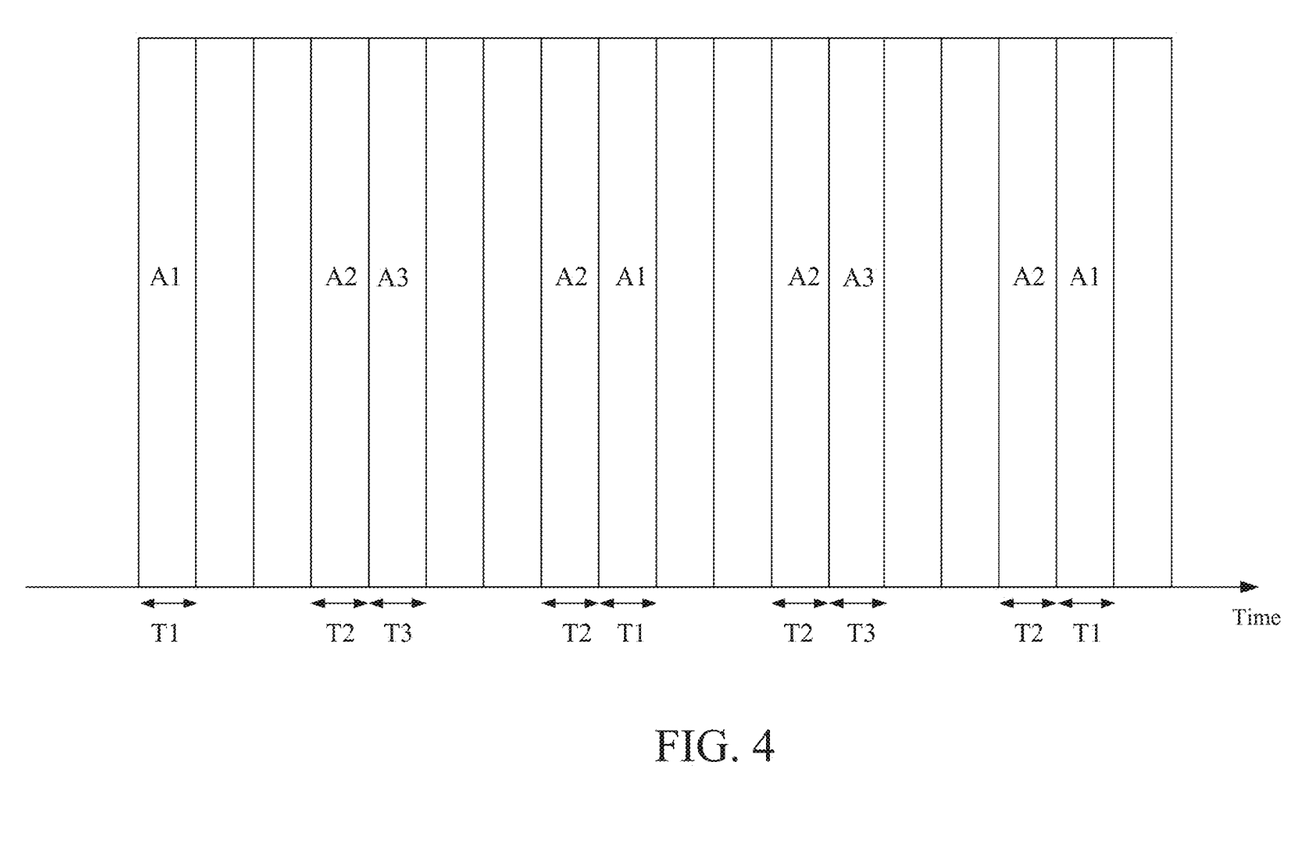
FIG. 4 is a schematic view of a schedule according to the second embodiment of the present invention.

The second embodiment of the present invention is as shown in FIG. 3, which is a schematic view of a control system 3. The second embodiment is different from the control system 1 of the first embodiment in that the mouse 13 in the second embodiment further has a third light transmission region P3 and a mirror M1, while the processor 13c is designed in advance to have the schedule of a first time interval T1, a second time interval T2 and a third time interval T3, as shown in FIG. 4. According to the schedule, the mouse 13 can further be used for a different application (i.e., an application A3) at the third time interval T3.

Specifically, in this embodiment, the schedule further defines the third time interval T3, so the light sensor 13b further senses an environment luminous intensity (i.e., an intensity of a natural light and/or a light generated by a lamp) through a third light guide path 14 to generate a third sensing signal 110 at the third time interval T3. The third light guide path 14 allows the third light to be transmitted to the light sensor 13b via the third light transmission region P3, the mirror M1 and the lens L1. Thus, according to the schedule, the processor 13c can further generate a third control signal 112 related to the application A3 according to the third sensing signal 110.

According to the first sensing signal 102, the second sensing signal 104 and the third sensing signal 110 generated by sensing the first light, the second light and the third light respectively, the processor 13c can generate different control signals (i.e., the first control signal 106, the second control signal 108 and the third control signal 112) so that the host 31 receives the first control signal 106, the second control signal 108 and the third control signal 112 to execute different operations.

For example, for the application A3, the processor 13c can calculate illuminance information according to the third sensing signal 110 to generate the third control signal 112 and transmit the third control signal 112 to the host 31 via the transmitter 13d so that the host adjusts a backlight brightness of a monitor (not shown) connected to the host according to the third control signal 112.

However, for the application A3 in another example where the monitor per se has a wireless receiver (e.g. a dongle plugged in), the processor 13c may also transmit the third control signal 112 to the monitor via the transmitter 13d directly so that the monitor adjusts a backlight brightness thereof according to the third control signal 112 directly without the need of the host 31.

Figure 5:
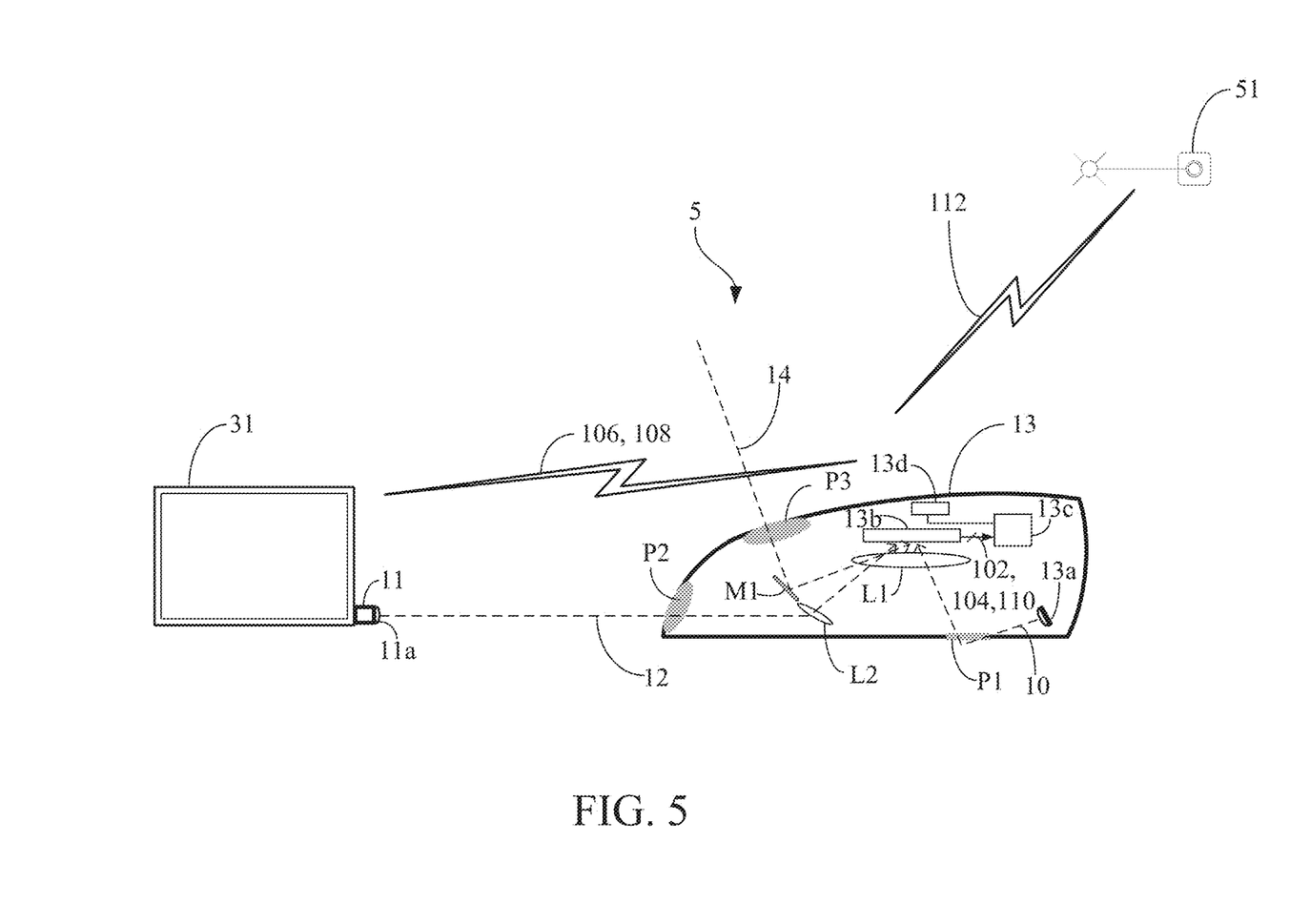
FIG. 5 is a schematic view of a control system 5 according to the third embodiment of the present invention.

The third embodiment of the present invention is as shown in FIG. 5, which is a schematic view of a control system 5. The third embodiment is different from the control system 3 of the second embodiment in that the application A3 in the third embodiment is designed to control a brightness of a lamp 51. Therefore, the lamp 51 has a wireless receiver for receiving the third control signal 112.

Specifically, according to the third sensing signal 110 generated by the light sensor 13b sensing the environment luminous intensity, the processor 13c can calculate illuminance information according to the third sensing signal 110 to generate the third control signal 112, and transmit the third control signal 112 to the lamp 51 via the transmitter 13d. After receiving the third control signal 112, the lamp 51 adjusts a light source brightness of a light source thereof according to the third control signal 112.

Figure 6:
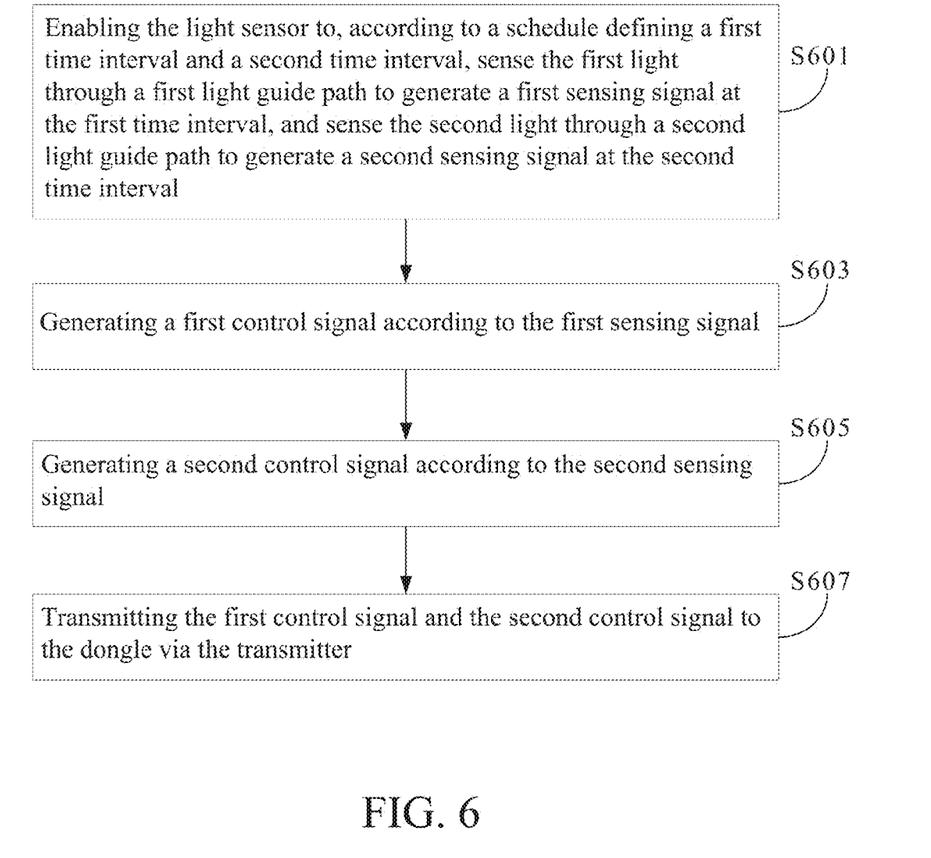
FIG. 6 is a flowchart diagram of a control method according to the fourth embodiment of the present invention.

The fourth embodiment of the present invention is as shown in FIG. 6, which is a flowchart diagram of a control method. The control method of the fourth embodiment can be used in a mouse (e.g., the mouse 13 of the first embodiment). The mouse is used with a dongle and is wirelessly connected to the dongle. The dongle is wiredly connected to a host and has a first light source for emitting a first light. The mouse comprises a transmitter, a second light source, a light sensor, and a processor. The second light source is configured to emit a second light. The processor is electrically connected to the transmitter and the light sensor. The control method is executed by the processor.

First, step S601 is executed to enable the light sensor to, according to a schedule defining a first time interval and a second time interval, sense the first light through a first light guide path to generate a first sensing signal at the first time interval, and sense the second light through a second light guide path to generate a second sensing signal at the second time interval. Then, step S603 is executed to generate a first control signal according to the first sensing signal. Step S605 is executed to generate a second control signal according to the second sensing signal.

Subsequently, step S607 is executed to transmit the first control signal and the second control signal to the dongle via the transmitter. Thus, the host wiredly connected to the dongle can receive the first control signal and the second control signal via the dongle to execute corresponding operations (e.g., calculate range information between the mouse and the dongle according to the first sensing signal to generate the first control signal so that the host adjusts a window size of a program running on the host according to the first control signal; and calculate displacement information according to the second sensing signal to generate the second control signal so that the host calculates a display position of a cursor according to the second control signal).

Furthermore, the mouse per se can also adjust an RF power of the transmitter according to the range information to reduce the power consumption. In addition to the aforesaid steps, the control method of the fourth embodiment can also execute all the operations set forth in the first embodiment and accomplish all the corresponding functions. The method in which the control method of the fourth embodiment executes these operations and accomplishes these functions can be readily appreciated by those of ordinary skill in the art based on the explanation of the first embodiment, and thus, will not be further described herein.

Figure 7:
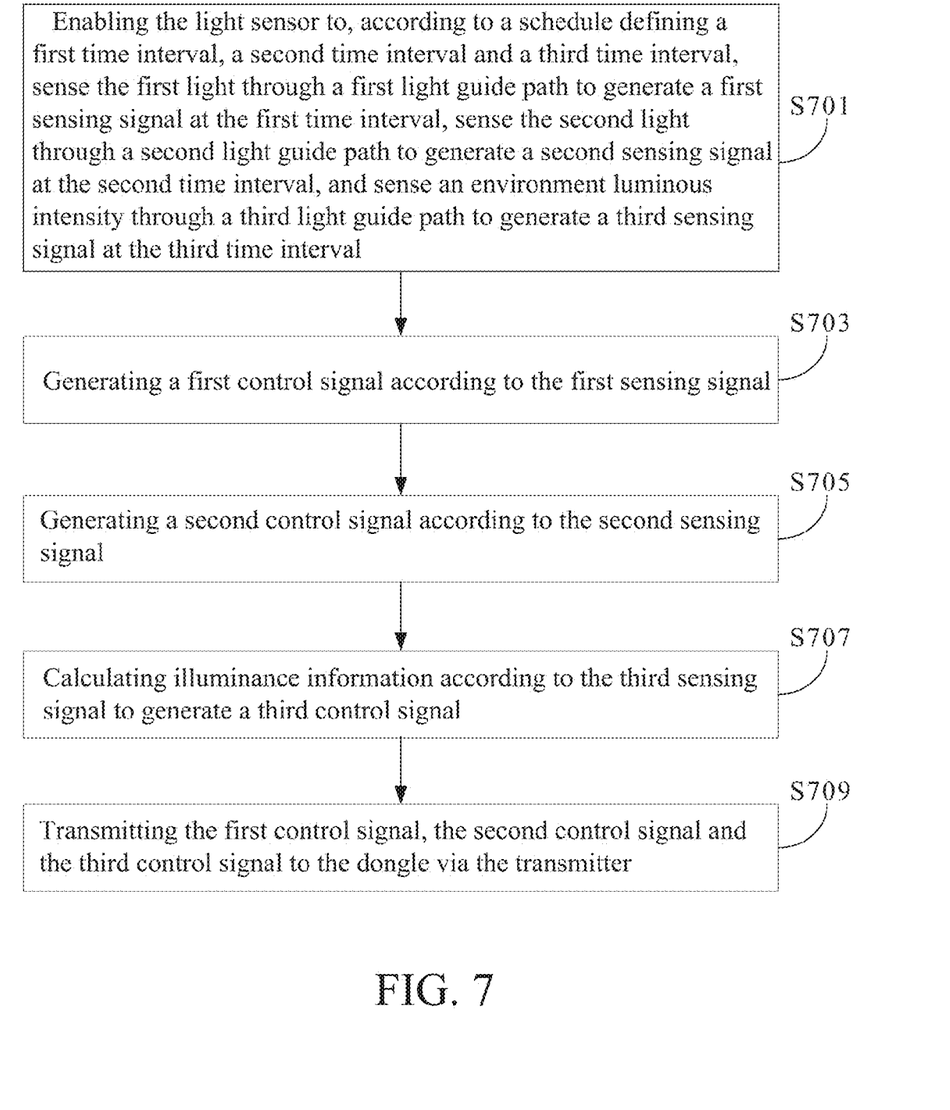
FIG. 7 is a flowchart diagram of a control method according to the fifth embodiment of the present invention.

The fifth embodiment of the present invention is as shown in FIG. 7, which is a flowchart diagram of a control method. The control method of the fifth embodiment can be used in a mouse (e.g., the mouse 13 of the second embodiment and the third embodiment). The mouse is used with a dongle and is wirelessly connected to the dongle. The dongle is wiredly connected to a host and has a first light source for emitting a first light. The mouse comprises a transmitter, a second light source, a light sensor, and a processor. The second light source is configured to emit a second light. The processor is electrically connected to the transmitter and the light sensor. The control method is executed by the processor.

First, step S701 is executed to enable the light sensor to, according to a schedule defining a first time interval, a second time interval and a third time interval, sense the first light through a first light guide path to generate a first sensing signal at the first time interval, sense the second light through a second light guide path to generate a second sensing signal at the second time interval, and sense an environment luminous intensity through a third light guide path to generate a third sensing signal at the third time interval. Then, step S703 is executed to generate a first control signal according to the first sensing signal. Step S705 is executed to generate a second control signal according to the second sensing signal. Step S707 is executed to calculate illuminance information according to the third sensing signal to generate a third control signal.

Subsequently, step S709 is executed to transmit the first control signal, the second control signal and the third control signal to the dongle via the transmitter. Thus, the host wiredly connected to the dongle can receive the first control signal, the second control signal and the third control signal via the dongle to execute corresponding operations (e.g., the host adjusts a backlight brightness of a monitor connected to the host according to the third control signal).

Furthermore, the step S709 may also be replaced by the following step: transmitting the first control signal and the second control signal to the dongle via the transmitter and transmitting the third control signal to a monitor so that the monitor adjusts the backlight brightness thereof according to the third control signal. Further, step S709 may further be replaced by the following step: transmitting the third control signal to a lamp via the transmitter so that the lamp adjusts a light source brightness of a light source thereof according to the third control signal.

In addition to the aforesaid steps, the control method of the fifth embodiment can also execute all the operations set forth in the second embodiment and the third embodiment and accomplish all the corresponding functions. The method in which the fifth embodiment executes these operations and accomplishes these functions can be readily appreciated by those of ordinary skill in the art based on the explanation of the second embodiment and the third embodiment, and thus, will not be further described herein.

According to the above descriptions, through the design of the optical structure and the schedule, the control system of the present invention senses different lights, which are generated by different light sources at different time intervals to execute different applications. Accordingly, as compared to the conventional optical mouse, the wireless optical mouse of the present invention has more applications.

The above disclosure is related to the detailed technical contents and inventive features thereof People skilled in this field may proceed with a variety of modifications and replacements based on the disclosures and suggestions of the invention as described without departing from the characteristics thereof Nevertheless, although such modifications and replacements are not fully disclosed in the above descriptions, they have substantially been covered in the following claims as appended.

What is claimed is:

1. A control system, comprising:
   a dongle, being wiredly connected to a host and having a first light source for emitting a first light; and
   a mouse, being wirelessly connected to the dongle and comprising:
      a transmitter;
      a second light source, being configured to emit a second light;
      a single light sensor, being configured to, according to a schedule defining a first time interval and a second time interval, sense the first light through a first light guide path to generate a first sensing signal at the first time interval and sense the second light through a second light guide path to generate a second sensing signal at the second time interval, wherein the first time interval and the second time interval are not overlapped to each other; and
      a processor electrically connected to the transmitter and the single light sensor, being configured to generate a first control signal according to the first sensing signal, generate a second control signal according to the second sensing signal and transmit the first control signal and the second control signal to the dongle via the transmitter so that the host receives the first control signal and the second control signal via the dongle.

2. The control system as claimed in claim 1, wherein the processor further calculates range information between the mouse and the dongle according to the first sensing signal and adjusts a radio frequency (RF) power of the transmitter according to the range information.

3. The control system as claimed in claim 1, wherein the processor further calculates range information between the mouse and the dongle according to the first sensing signal to generate the first control signal so that the host adjusts a window size of a program running on the host according to the first control signal.

4. The control system as claimed in claim 1, wherein the processor calculates displacement information according to the second sensing signal to generate the second control signal so that the host adjusts a display position of a cursor according to the second control signal.

5. The control system as claimed in claim 1, wherein the schedule further defines a third time interval, the single light sensor of the mouse further senses an environment luminous intensity through a third light guide path to generate a third sensing signal at the third time interval, and the processor further calculates illuminance information according to the third sensing signal to generate a third control signal and transmits the third control signal to the host via the transmitter so that the host adjusts a backlight brightness of a monitor connected to the host according to the third control signal, wherein the first time interval, the second time interval and the third time interval are not overlapped to each other.

6. The control system as claimed in claim 1, wherein the schedule further defines a third time interval, the single light sensor of the mouse further senses an environment luminous intensity through a third light guide path to generate a third sensing signal at the third time interval, and the processor further calculates illuminance information according to the third sensing signal to generate a third control signal and transmits the third control signal to a monitor via the transmitter so that the monitor adjusts a backlight brightness according to the third control signal, wherein the first time interval, the second time interval and the third time interval are not overlapped to each other.

7. The control system as claimed in claim 1, wherein the schedule further defines a third time interval, the single light sensor of the mouse further senses an environment luminous intensity through a third light guide path to generate a third sensing signal at the third time interval, and the processor further calculates illuminance information according to the third sensing signal to generate a third control signal and transmits the third control signal to a lamp via the transmitter so that the lamp adjusts a light source brightness according to the third control signal, wherein the first time interval, the second time interval and the third time interval are not overlapped to each other.

8. A mouse used with a dongle, the dongle being wiredly connected to a host and having a first light source for emitting a first light, the mouse being wirelessly connected to the dongle and comprising:
   a transmitter;
   a second light source, being configured to emit a second light;
   a single light sensor, being configured to, according to a schedule defining a first time interval and a second time interval, sense the first light through a first light guide path to generate a first sensing signal at the first time interval, and sense the second light through a second light guide path to generate a second sensing signal at the second time interval, wherein the first time interval and the second time interval are not overlapped to each other; and
   a processor electrically connected to the transmitter and the single light sensor, being configured to generate a first control signal according to the first sensing signal, generate a second control signal according to the second sensing signal and transmit the first control signal and the second control signal to the dongle via the transmitter so that the host receives the first control signal and the second control signal via the dongle.

9. The mouse as claimed in claim 8, wherein the processor further calculates range information between the mouse and the dongle according to the first sensing signal and adjusts an RF power of the transmitter according to the range information.

10. The mouse as claimed in claim 8, wherein the processor further calculates range information between the mouse and the dongle according to the first sensing signal to generate the first control signal so that the host adjusts a window size of a program running on the host according to the first control signal.

11. The mouse as claimed in claim 8, wherein the processor calculates displacement information according to the second sensing signal to generate the second control signal so that the host calculates a display position of a cursor according to the second control signal.

12. The mouse as claimed in claim 8, wherein the schedule further defines a third time interval, the single light sensor further senses an environment luminous intensity through a third light guide path to generate a third sensing signal at the third time interval, and the processor further calculates illuminance information according to the third sensing signal to generate a third control signal, and transmits the third control signal to the host via the transmitter so that the host adjusts a backlight brightness of a monitor connected to the host according to the third control signal, wherein the first time interval, the second time interval and the third time interval are not overlapped to each other.

13. The mouse as claimed in claim 8, wherein the schedule further defines a third time interval, the single light sensor further senses an environment luminous intensity through a third light guide path to generate a third sensing signal at the third time interval, and the processor further calculates illuminance information according to the third sensing signal to generate a third control signal, and transmits the third control signal to a monitor via the transmitter so that the monitor adjusts a backlight brightness according to the third control signal, wherein the first time interval, the second time interval and the third time interval are not overlapped to each other.

14. The mouse as claimed in claim 8, wherein the schedule further defines a third time interval, the single light sensor further senses an environment luminous intensity through a third light guide path to generate a third sensing signal at the third time interval, and the processor further calculates illuminance information according to the third sensing signal to generate a third control signal, and transmits the third control signal to a lamp via the transmitter so that the lamp adjusts a light source brightness according to the third control signal, wherein the first time interval, the second time interval and the third time interval are not overlapped to each other.

15. A control method for a mouse, the mouse being used with a dongle and being wirelessly connected to the dongle, the dongle being wiredly connected to a host and having a first light source for emitting a first light, the mouse comprising a transmitter, a second light source, a single light sensor, and a processor, the second light source being configured to emit a second light, the processor being electrically connected to the transmitter and the single light sensor, the control method being executed by the processor, and comprising:
  enabling the single light sensor to, according to a schedule defining a first time interval and a second time interval, sense the first light through a first light guide path to generate a first sensing signal at the first time interval, and sense the second light through a second light guide path to generate a second sensing signal at the second time interval, wherein the first time interval and the second time interval are not overlapped to each other;
  generating a first control signal according to the first sensing signal;
  generating a second control signal according to the second sensing signal; and
  transmitting the first control signal and the second control signal to the dongle via the transmitter so that the host receives the first control signal and the second control signal via the dongle.

16. The control method as claimed in claim 15, further comprising:
  calculating range information between the mouse and the dongle according to the first sensing signal, and adjusting an RF power of the transmitter according to the range information.

17. The control method as claimed in claim 15, further comprising:
  calculating range information between the mouse and the dongle according to the first sensing signal to generate the first control signal so that the host adjusts a window size of a program running on the host according to the first control signal.

18. The control method as claimed in claim 15, further comprising:
  calculating displacement information according to the second sensing signal to generate the second control signal so that the host calculates a display position of a cursor according to the second control signal.

19. The control method as claimed in claim 15, wherein the schedule further defines a third time interval, and the control method further comprises:
  enabling the single light sensor to sense an environment luminous intensity through a third light guide path to generate a third sensing signal at the third time interval;
  calculating illuminance information according to the third sensing signal to generate a third control signal; and
  transmitting the third control signal to the host via the transmitter so that the host adjusts a backlight brightness of a monitor connected to the host according to the third control signal,
  wherein the first time interval, the second time interval and the third time interval are not overlapped to each other.

20. The control method as claimed in claim 15, wherein the schedule further defines a third time interval, and the control method further comprises:
  enabling the single light sensor to sense an environment luminous intensity through a third light guide path to generate a third sensing signal at the third time interval;
  calculating illuminance information according to the third sensing signal to generate a third control signal; and
  transmitting the third control signal to a monitor via the transmitter so that the monitor adjusts a backlight brightness according to the third control signal;
  wherein the first time interval, the second time interval and the third time interval are not overlapped to each other.

21. The control method as claimed in claim 15, wherein the schedule further defines a third time interval, and the control method further comprises:
  enabling the single light sensor to sense an environment luminous intensity through a third light guide path to generate a third sensing signal at the third time interval;
  calculating illuminance information according to the third sensing signal to generate a third control signal; and transmitting the third control signal to a lamp via the transmitter so that the lamp adjusts a light source brightness according to the third control signal;
wherein the first time interval, the second time interval and the third time interval are not overlapped to each other.

* * * * *